United States Patent [19]

Blanz

[11] Patent Number: 5,044,399

[45] Date of Patent: Sep. 3, 1991

[54] SWITCH VALVE

[75] Inventor: Roland Blanz, Heiligkreuzsteinach, Fed. Rep. of Germany

[73] Assignee: Grau GmbH, Fed. Rep. of Germany

[21] Appl. No.: 521,753

[22] Filed: May 10, 1990

[30] Foreign Application Priority Data

May 16, 1989 [DE] Fed. Rep. of Germany ....... 3915827

[51] Int. Cl.$^5$ ...................... F15B 13/043; F15B 13/06
[52] U.S. Cl. .......................... 137/596.15; 137/596.16; 280/714
[58] Field of Search ...................... 137/596.15, 596.16; 280/714

[56] References Cited

FOREIGN PATENT DOCUMENTS 3344022 6/1985 Fed. Rep. of Germany .
3424670 2/1989 Fed. Rep. of Germany .

*Primary Examiner*—Gerald A. Michalsky
*Attorney, Agent, or Firm*—Thomas, Kerr & Kayden

[57] ABSTRACT

A switch valve (1) connectable on the inlet side to a levelling valve (18) via control line (20) and also electrically activatable, which the positions raise, lower, drive and stop, possesses, on a housing (2), a supply connection (14) for a compressed-air source, an outlet (10) and at least one connection piece (11) for connection to a pneumatic-spring bellows (13), a slide (6) and a hollow double-valve body (24) being switchable in the housing (2) into the four positions via two switch pistons (4, 5) and two solenoid valves (37, 38) preceding these, and an inlet valve (24, 26,) an outlet valve (31, 35;32, 35, etc.) and a shutoff valve (27, 30) for the respective connection and isolation of the lines thereby being formed in the four positions. The hollow double-valve body (24) has a connection piece (21) located on the end face and intended for the control line (20) brought up from the levelling valve (18). The supply connection (14) for the compressed-air source and the conection piece (11) for connection to the pneumatic-spring bellows (13) are arranged between the connection piece (21) located on the end face and the outlet (10).

8 Claims, 3 Drawing Sheets

SWITCH VALVE

BACKGROUND OF THE INVENTION

The invention relates to a switch valve connectable on the inlet side to a levelling valve via a control line and also electrically activatable, which has the positions raise, lower, drive and stop and which possesses, on a housing, a supply connection for a compressed-air source, an outlet and at least one connection piece for connection to pneumatic-spring bellows, a slide and a hollow double-valve body being switchable in the housing into the four positions via two switch pistons and two solenoid valves preceding these, and an inlet valve, an outlet valve and a shutoff valve for the respective connection and isolation of the lines thereby being formed in the four positions. This switch valve is a valve which is used for the arbitrary raising and lowering of the vehicle body and which is employed in a system where there is also a levelling valve for automatically keeping the height of the chassis of the vehicle constant during driving and during loading and unloading operations. A switch valve of the type described in the introduction is known within a control system from German Patent Specification 3, 344, 022. The switch valve is of two-circuit design. The switch valve is preceded by an electrical switch, via which the arbitrary raising and lowering can be selected and which, furthermore, also has a drive position, in which the automatic keeping of the chassis height of a vehicle constant via levelling valves is selected on the switch valve. Via two switch pistons and two preceding solenoid valves, a single slide is arranged displaceably in the housing and at its free end has a spring-suspended moveable part.

Moreover, the housing accommodates, in the region of the housing end facing away from the solenoid valves, a double-valve body which is made hollow for deaeration purposes and on which the outlet is therefore provided. The return spaces of the switch pistons therefore have to be connected separately to the atmosphere. This two-circuit design of the switch valve results in a relatively large constructional length, since the particular control line from the levelling valve and the particular line leading to the bellows of the circuit are respectively arranged successively in duplicate on the slide. If this known switch valve is modified to become a single-circuit type, some of the constructional length is omitted. However, the free cross-sections for aeration during arbitrary raising and for deaeration during arbitrary lowering are of equal size irrespective of the single-circuit or two-circuit design. This is a disadvantage for the two-circuit design or signifies here aeration and deaeration times which last longer.

A similar switch valve is also known from German Patent Specification 3, 424, 670. This switch valve is also of two-circuit design, at all events where the drive position is concerned, each circuit being controlled via a separate levelling valve. Here too, the control lines brought up from the levelling valves are provided radially on the housing of the switch valve, that is to say radially relative to the axis of the slides and switch pistons. The supply connection for the compressed-air source is connected to, and the inlet valve arranged at, the housing end facing away from the switch pistons, that is to say in the region of the end face located there. A closed double-valved body is used here. For each circuit there is at least one slide, so that for the two-circuit version two or three slides are assigned to two common switch pistons. The slides are of different design. Even if such a two-circuit switch valve were reduced to a single-circuit version, at least two slides would have to be provided, since either the inlet valve and the outlet valve are implemented on separate slides or else an additional slide is provided for this. Even in such a possible single-circuit embodiment, the free cross-sections of the inlet valve and the outlet valve do not change in comparison with the two-circuit version, and therefore longer aeration and deaeration times can result in the two-circuit version.

In a disadvantageous way, the known switch valves in the single-circuit and the two-circuit version require differently designed individual parts, especially slides, in each case. This not only makes production more expensive, but also presupposes, for proper functioning and proper installation after maintenance or repair, that the differently designed slides should not be installed interchanged. The free passage cross-sections of the inlet valve and of the outlet valve each depend, of course, on the absolute constructional size of the switch valve and on the prevailing geometrical conditions. However, it seems to be a fundamental disadvantage that these cross-sections are of the same size in both the two-circuit version and the single-circuit version.

SUMMARY OF THE INVENTION

The object on which the invention is based is to design a switch valve of the type described in the introduction on the modular principle, in which the same components are used irrespective of a single-circuit or a multi-circuit version. This is intended to improve both the production of individual parts, their use and exchange for purposes of maintenance and repair.

According to the invention, this is achieved in that the hollow double-valve body has a connection piece located on the end face and intended for the control line brought up from the levelling valve, and in that the supply connection for the compressed-air source and the connection piece for connection to the pneumatic-spring bellows are arranged between the connection piece located on the end face and the outlet. The hollow double-valve body therefore no longer carries the outlet, with the result that it advantageously becomes possible to arrange the deaeration at another location. On the contrary, the control line brought up from the levelling valve is guided through the hollow double-valve body. This arrangement of the control line on the end face or at the end, which can of course also be implemented radially with a deflection, is therefore basically provided at the end of the housing which faces away from the switch pistons and the two solenoid valves. This lays the basis for the modular principle. The switch valve therefore does not become any longer, even in a multi-circuit design and arrangement. Each circuit is assigned a slide with a double-valve body and two switch pistons, thereby producing the respective constructional unit which can also be used multiply with axes parallel to one another in a multi-circuit arrangement. At the same time, in the multi-circuit version, the implementation of this modular principle affords the advantage that the free cross-sections of the inlet valves and of the outlet valves increase in comparison with the single-circuit embodiment, that is to say are doubled in the two-circuit version. This means, in absolute terms, relatively short aeration and deaeration times of approximately equal length, irrespective of a single-circuit or a two-circuit design, provided, of course, that the air volume to be filled is comparable.

The outlet can be connected to the return spaces of the switch pistons, so that, in the final analysis, only one deaeration connection leading out from the housing into the atmosphere has to be provided. This is possible because the various connections are provided in the sequence to be seen which, starting from the end face, begins with the connection for the control line from the levelling valve and terminates at the outlet into the atmosphere, the connection pieces for the supply air and the pneumatic-spring bellows being provided in one arrangement sequence or the other between these two connections.

The hollow double-valve body can have a cylindrical seat surface and adjoining this a stop; at the same time, the slide is designed to be retractable into the seat surface of the double-valve body, thereby forming the shutoff valve. As a result of this design, in addition to the housing there are provided only two parts moveable relative to the housing and relative to one another, to be precise the slide, on the one hand, and the doublevalve body, on the other hand. The number of moveable parts in comparison with the switch valve of the generic type is therefore advantageously reduced, without the functioning being impaired. The double-valve body is therefore not only an integral part of the inlet valve and of the outlet valve, but at the same time also of the shutoff valve. The slide forms an integral part of all three valves mentioned.

At the same time, the cylindrical seat surface of the double-valve body can have a diameter constant over its length. With the shutoff valve opened, the slide is then moved out of the seat surface of the double-valve body. This constitutes the uppermost position of the two switch valves, the drive position advantageously being assigned to this currentless position of the solenoid valves.

On the other hand, there is the possibility of interrupting the seat surface of the double-valve body by a widening which is assigned to the open position of the shutoff valve. Thus, under all circumstances, the front end of the slide moves only in the hollow double-valved body and the stop position can advantageously be assigned to the uppermost position of the two switch pistons, when the solenoid valves are currentless. In the two instances described, the slide and the design and arrangement of the various seals on the slide are somewhat different. In both case, however, approximately the same constructional length is obtained. The raise and lower positions are assigned to the two furthest extended positions of the two switch pistons.

The modular principle affords the possibility, for a two-circuit or a multi-circuit version, to use the single-circuit switch valve two or more times within a system. Another possibility is to accommodate the essential individual parts of the switch valve according to the single-circuit arrangement multiply in parallel next to one another in a separate housing made for the two-circuit or multi-circuit version. Thus, in particular, parts which are the same in relation to each circuit are then used, appropriately with the exception of the solenoid valves which have to be provided only singly, even in a multi-circuit embodiment. For purposes of maintenance and/or repair, the individual parts can then respectively be exchanged, without the danger that the wrong parts will be installed in the particular position. At the same time, in a two-circuit version, it is also possible for two separate switch pistons to be assigned to each slide. The switch pistons of all the circuits can be activatable via only two solenoid valves.

Preferred exemplary embodiments of the switch valve according to the invention are illustrated in the drawings and described hereafter. In the drawings.

DETAILED DESCRIPTION

Figure 1:
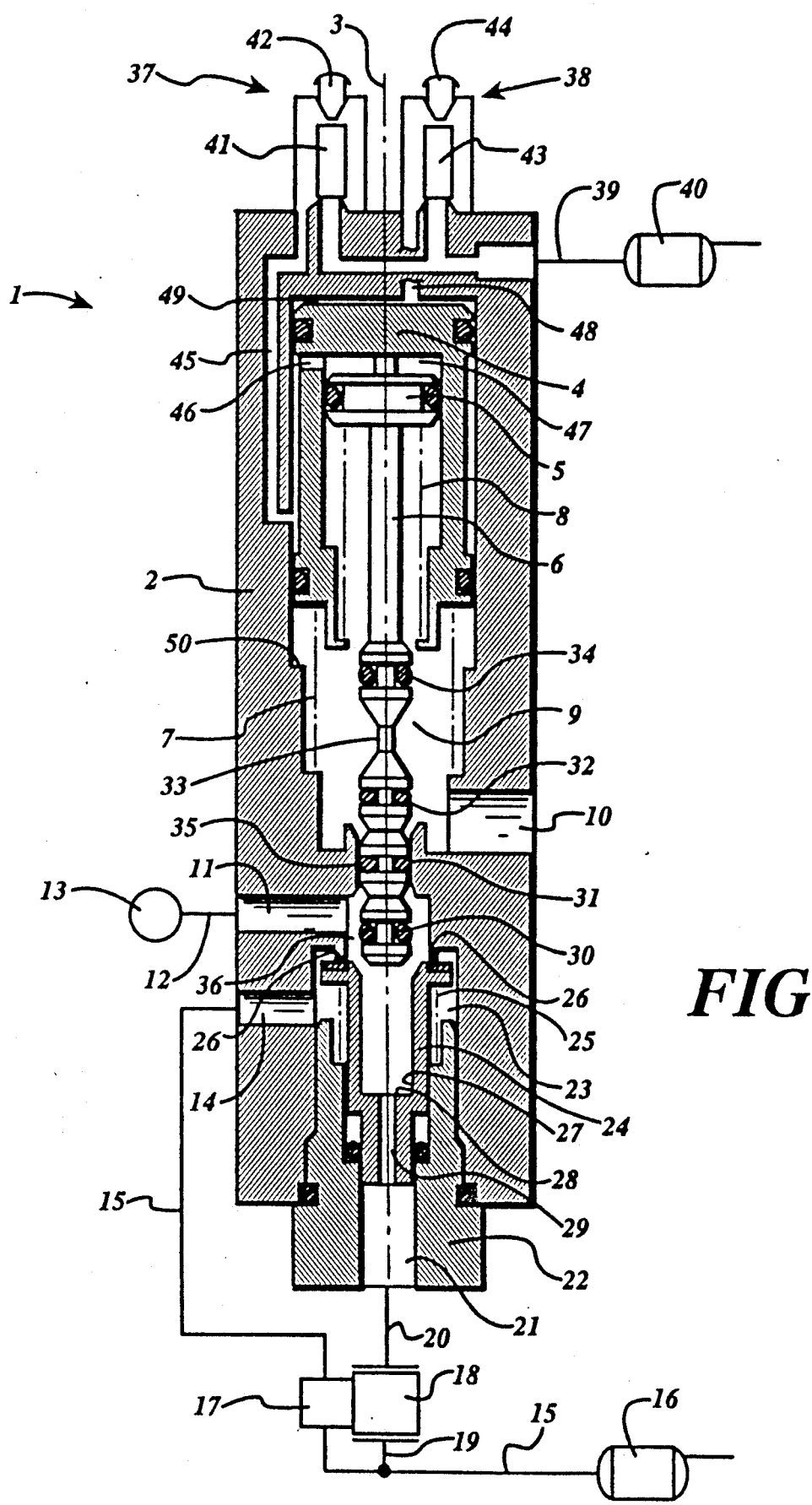
FIG. 1 shows a section through a single-circuit switch valve in a first embodiment.

The switch valve 1 illustrated in FIG. 1 is of single-circuit design and has a housing 2 which is appropriately made divided. Mounted sealingly and displaceably in the way shown, in an arrangement aligned with an axis 3, are two switch pistons 4 and 5, of which the switch piston 5 is equipped with or connected to a slide 6. The switch pistons 4 and 5 are supported on return springs 7 and 8 which are arranged in a common return space 9. An outlet 10 leading into the atmosphere is connected to this return space 9. In the direction of that end of the housing 1 facing away from the switch pistons 4 and 5 there is, in the radial direction, after the outlet 10, a connection piece 11 for the connection of a line 12 which leads to one or a plurality of pneumatic-spring bellows 13. In order thereafter, a supply connection 14 is provided on the housing 2, via which a supply line 15 is appropriately brought up from a compressed-air source via a compressed-air supply tank 16. The supply line 15 can be guided via a height-limiting part 17 of a levelling valve 18. The levelling valve 18 is fed via a line 19 which branches off from the supply line 15 after the compressed-air supply tank 16. A control line 20 is connected to a connection piece 21 on the end face, that is to say at the opposite end, at which the switch pistons 4 and 5 are arranged in the housing. The connection piece 21 is, here, an integral part of an insert 22 which is screwed sealingly in the housing 2. The orifice of the connection piece 21 extends, here, in the direction of the axis 3, but can just as well also be implemented radially relative to the axis 3 in the insert 22. The control line 20 is here brought up to the switch valve 1 from the levelling valve 18. In a supply chamber 23 formed between the housing 2 and insert 22 a double-valve body 24 is mounted sealingly and displaceably and is supported on the spring 25. The double-valve body 24 forms, with a projecting edge 26 located on the housing side, an inlet valve 24, 26. In the housing, it limits the supply chamber 23 which is connected permanently to the supply connection 14. The double-valve body 24 is made hollow on the inside. Starting from its end facing the inlet valve 24, 26, it has a cylindrical seat surface 27 which merges into a stop 28 and which is continued in a perforation 29 leading to the connection piece 21.

Arranged in succession on the slide 6 are three seals 30, 31, 32, a narrowing 33 and a further seal 34 which, with the exception of the narrowing 33, all have the same outside diameter and which, depending on the particular position, interact on the one hand with a correspondingly adapted cylindrical bore 35 and with the seat surface 27.

The bore 35 forms the seat surface of an outlet valve 31, 35 or 32, 35 or 34, 35, depending on the particular position. The seal 30 forms with the seat surface 27 a shutoff valve 27, 30. The slide 6 passes, in the housing 2, through a chamber 36 which is connected permanently to the connection piece 11 and therefore to the pneumatic-spring bellows 13.

At the end of the housing 2, in which the switch pistons 4 and 5 are arranged, there are also two solenoid valves 37 and 38 which are fed via a line 39 with compressed air from a compressed-air supply tank 40, which can also be the compressed-air supply tank 16 or be connected to this. The solenoid valve 37 has a core 41 and a deaeration 42. The solenoid valve 38 has a core 43 and a deaeration 44. A control line 45 leads from the solenoid valve 37 via a bore 46 into a switch chamber 47 between the two switch pistons 4 and 5. On the other hand, a control line 48 leads from the solenoid valve 38 to a switch chamber 49 which is assigned to the switch piston 4.

FIG. 1 illustrates the currentless position of the solenoid valves 37 and 38, which is assigned to the drive position of the switch valve 1. As is evident, the control lines 47 and 48 are connected to the atmosphere in a pressureless manner or via the deaerations 42 and 44. Consequently, the two switch pistons 4 and 5 are in their uppermost position as a result of the force of the return springs 7 and 8, the slide 6 also assuming its uppermost position as a result of the take-up by the switch piston 5. The outlet valve 31, 35 is at the same time closed. The inlet valve 24, 26 is also closed. The shutoff valve 27, 30 is opened, so that, in the drive position, the corresponding pressure is fed from the levelling valve 18 into the pneumatic-spring bellows 13 via the control line 20. It goes without saying that, by means of this levelling valve 18, a desired set body height relative to the chassis is maintained irrespective of the loading state The solenoid valves 37 and 38 are arbitrarily controllable into the three remaining positions stop, lower and raise via electrical or electronic control devices (not shown). In the stop position, the solenoid valve 38 is energized, whilst the solenoid valve 37 remains non-energized. Consequently, the core 43 closes the deaeration 44 and the switch chamber 49 is subjected to compressed air from the compressed-air supply tank 40 via the switch piston 4, so that the two switch pistons 4 and 5 execute a first stroke which is limited by a stop 50 on the housing 2. The result of this is that the slide 6 together with its seal 30 retracts into the seat surface 27, so that the shutoff valve 27, 30 closes. The levelling valve 18 is thus isolated from the pneumatic-spring bellows 13 and closed off. At the same time, the seal 32 enters the bore 35, so that, as before, the outlet valve remains closed. The inlet valve 24, 26 also remains closed, so that all the line connections are shut off from one another. Only the common return space 9 of the switch pistons 4 and 5 is connected to the atmosphere via the outlet 10.

To obtain the lowering position, the solenoid valve 37 is energized, whilst the solenoid valve 38 is transferred into the non-energized position or remains in this position. Consequently, only the switch chamber 47 is subjected to compressed air, so that the seal 30 of the shutoff valve moves further into the seat surface 27, but without the front end of the slide 6 yet reaching the stop 28. The shutoff valve 27, 30 therefore continues to remain closed. The inlet valve 24, 26 also remains closed. In contrast, the outlet valve opens because the narrowing 33 enters the region of the bore 35, so that compressed air can flow out of the pneumatic-spring bellows 13 via a line 12, the connection piece 11, the chamber 36 and the narrowing 33 into the return space 9 and from there via the outlet 10 into the atmosphere. The vehicle body is thus lowered.

For the arbitrary raising of the body relative to the chassis, the two solenoid valves 37 and 38 are energized, so that the two switch pistons 4 and 5 are subjected to compressed air in their switch chambers 47 and 49 and the slide 6 executes the stroke obtained from the sum of the two individual strokes. Thus, the front end of the slide 6 strikes the stop 28, and in a continuation of this path the inlet valve 24, 26 is opened. The seal 34 has previously entered the region of the bore 35, so that the outlet valve 34, 35 has been closed. As before, the shutoff valve 27, 30 is closed. Compressed air consequently flows out of the compressed-air supply tank 16 via the line 15, the supply connection 14, the supply chamber 23 and via the opened inlet valve 24, 26 into the chamber 36 and from there via the connection piece 11 and the line 12 into the pneumatic-spring bellows 13, so that the vehicle body is raised relative to the chassis. This raising lasts as long as the two solenoid valves 37 and 38 remain energized. As a safeguard, the height-limiting part 17 of the levelling valve 18 cuts off the further supply of compressed air when the maximum height not to be exceeded is reached. On the other hand, however, by terminating the corresponding switching operation a desired arbitrary height provided within this framework can be activated by raising.

The design of the individual parts of the switch valve in accordance with the modular principle is an essential feature. Substantially identical parts are provided for each circuit, and this can easily be seen by comparison with the two-circuit switch valve according to FIG. 2. Otherwise being of the same embodiment, all the individual parts, with the exception of the housing 2 and of the solenoid valves 37 and 38 in the housing 2, are provided in duplicate. It is sufficient to equip one of the two levelling valves 18 with a height-limiting part 17. It is also possible to provide a common outlet 51 for the two circuits and to design these, for example, with a double cross-section in relation to the arrangement and the cross-section of the outlet 10 of FIG. 1. In this way, only one orifice of the housing 2 is obtained. However, it is, of course, also possible to provide two outlets 10 separate from one another. It is pointed out especially that here, too, the switch pistons 4 and 5 are each provided once for each circuit, that is to say double as a whole. As a result of this design possibility in place of common switch pistons, the housing 2 of the switch valve 1 acquires an advantageously flat, essentially rectangular cross-section, so that the constructional size is reduced in this respect. It is especially important, however, that a separate inlet valve 24, 26 be provided for each circuit, so that, with the same absolute constructional size, double the inflow cross-section during raising is obtained in comparison with the single-circuit switch valve of FIG. 1. Double the outflow cross-section during lowering can also be provided as a result of the appropriate design of the common outlet 51. Since the shutoff valve 27, 30 and the corresponding passages are also provided in duplicate, the shutoff valve 27, 30 also has twice as large passage cross-sections in the two-circuit version in comparison with the single-circuit version. The actuating times required for aeration and deaeration are therefore not increased, even in a multi-circuit version, if correspondingly identical air volumes of the pneumatic-spring bellows 13 are assumed.

Figure 2:
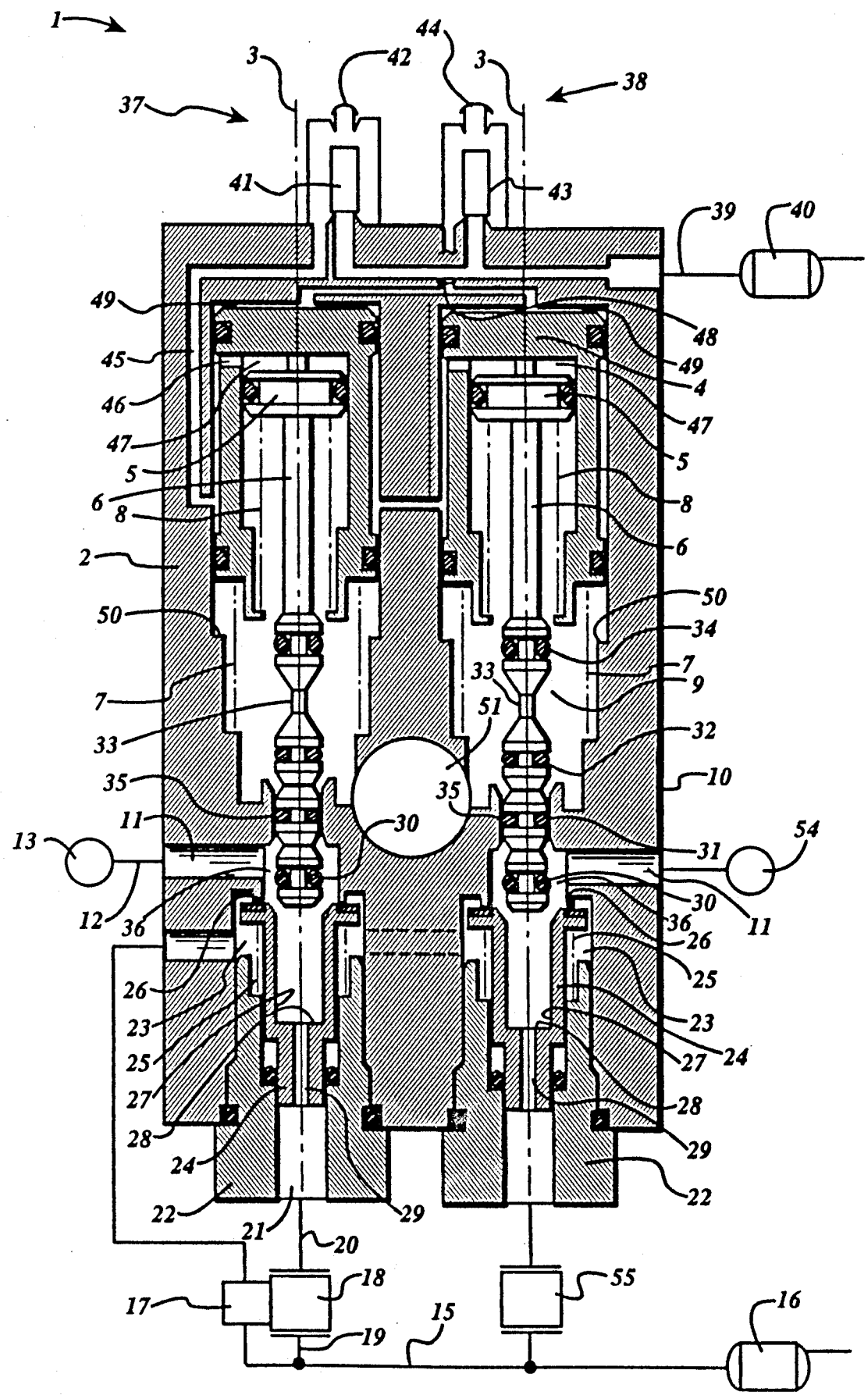
FIG. 2 shows a section through a two-circuit switch valve, in which, with the exception of the housing, the same individual parts are used in duplicate as in the single-circuit embodiment of FIG. 1.

It goes without saying, that in the exemplary embodiment of FIG. 2, as well, the four positions drive, stop, lower, raise are selectable in succession, as already described in relation to the exemplary embodiment of FIG. 1. Thus, when the solenoid valves 37, 38 are in the currentless state, the drive position is also assigned to the two-circuit version according to FIG. 2.

Figure 3:
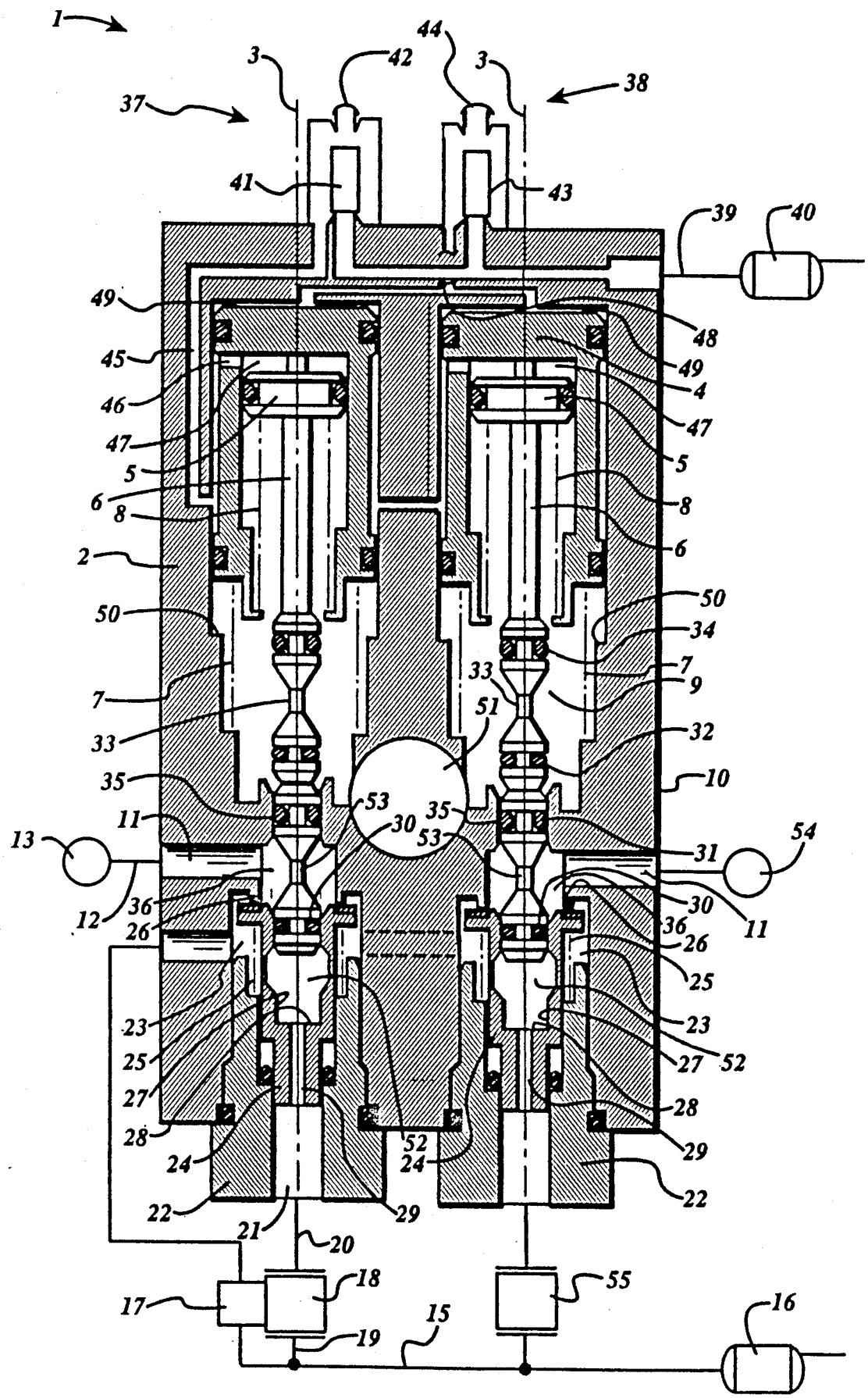
FIG. 3 shows a second embodiment of a two-circuit switch valve with a correspondingly double arrangement of the individual parts.

The embodiment of FIG. 3 shows the switch valve 1, which is of the two-circuit design. For this purpose, a double arrangement of the respective individual parts with the axes 3 parallel to one another is provided once again. The single-circuit version can be derived directly by providing the individual parts, provided double here, only singly, as can be seen, on the other hand, from the exemplary embodiment of FIG. 2 in comparison with that of FIG. 1.

The detailed design is largely identical, with the following differences. Here, the cylindrical seat surface 27 is interrupted by a widening 52 in the double-valve body 24. A further narrowing 53 is provided on the slide 6 between the seal 30 and the seal 31. Consequently, the drive and stop positions are arranged in the reverse sequence in relation to the exemplary embodiment of FIGS. 1 and 2, so that, here, the stop position is assigned to the currentless position of the solenoid valves 37 and 38, which is also shown in FIG. 3. It can be seen that both the inlet valves 24, 26, the shutoff valves 27, 30 and the outlet vales 31, 35 are closed. When the solenoid valve 38 alone is energized, the drive position is achieved, in that the seal 30 enters the region of the widening 52 and the narrowing 53 is located opposite one part of the seat surface 27, so that the pneumatic-spring bellows 13 and 54 of the two circuits are correspondingly activatable by the two levelling valves 18 and 55. As also in the exemplary embodiments of FIGS. 1 and 2, these two positions are then followed by the positions lower and raise.

List of reference symbols:

1 = Switch valve
2 = Housing
3 = Axis
4 = Switch piston
5 = Switch piston
6 = Slide
7 = Return spring
8 = Return spring
9 = Return space
10 = Outlet
11 = Connection piece
12 = Line
13 = Pneumatic-spring bellows
14 = Supply connection
15 = Supply line
16 = Compressed-air supply tank
17 = Height-limiting part
18 = Levelling valve
19 = Line
20 = Control line
21 = Connection piece
22 = Insert
23 = Supply chamber
24 = Double-valve body
25 = Spring
26 = Edge
27 = Seat surface
28 = Stop
29 = Perforation
30 = Seal
31 = Seal
32 = Seal
33 = Narrowing
34 = Seal
35 = Bore
36 = Chamber
37 = Solenoid valve
38 = Solenoid valve
39 = Line
40 = Compressed-air supply tank
41 = Core
42 = Deaeration
43 = Core
44 = Deaeration
45 = Control line
46 = Bore
47 = Switch chamber
48 = Control line
49 = Switch chamber
50 = Stop
51 = Outlet
52 = Widening
53 = Narrowing
54 = Pneumatic-spring bellows
55 = Levelling valve

I claim:

1. A switch valve having an inlet side, an outlet side, and an end face, and being connectable on said inlet side to a levelling valve by means of a control line, said switch valve being actuatable to a raise position, a lower position, a drive position, and a stop position;

said switch valve further comprising a housing, a supply connection in said housing for connecting the housing to a compressed air source, an outlet in said housing, and a first connection piece in said housing for connecting the housing to a pneumatic spring bellows, a hollow double valve body having an end face, a slide member having first and second ends, said first end being adapted for movement within said hollow double valve body, means for moving said slide member relative to said hollow double valve member to positions corresponding to the raise, lower, drive and stop positions, said means for moving comprising first and second movable switch pistons, said first switch piston being attached to said second end of said slide member and adapted to move within said second switch piston, means for controlling the movement of said first and second switch pistons comprising first and second valve means, said hollow double valve member having a second connection piece in the end face thereof for connection to said control line, said supply connection and said first connection piece being located on said housing between said second connection piece and said outlet.

2. A switch valve as claimed in claim 1 wherein said housing has a return space for said pistons, and said outlet is connected to said return space.

3. A switch valve as claimed in claim 1 wherein said hollow double valve body has an elongated cylindrical seat surface and a stop adjoining said seat surface, said slide member being movable into said seat surface under control of said first and second pistons.

4. A switch valve as claimed in claim 3 wherein said cylindrical seat surface has a constant diameter over its length.

5. A switch valve as claimed in claim 3 wherein said cylindrical seat surface has a first diameter over a first portion of its length and a second, greater diameter over a second portion of its length.

6. A switch valve as claimed in claim 1 and further including a second slide member having first and second ends, and means for moving said second slide member comprising third and fourth movable switch pistons.

7. A switch valve as claimed in claim 1 wherein said first and second valve means control the movement of said third and fourth movable pistons.

8. A switch valve including:
   a housing defining an elongated valve chamber,
   a first supply connection intersecting the valve chamber intermediate the ends,
   a second supply connection intersecting the valve chamber at one end of said valve chamber,
   valve bore formed at the other end of said valve chamber,
   a double valve body positioned in and movable along the length of said valve chamber for opening and closing said first supply connection,
   means for biasing said double valve body toward closed relationship with said first supply connection,
   said double valve body defining a perforation therethrough in fluid communication with said second supply connection with said perforation defining a cylindrical seat surface,
   an elongated slide movable through said valve bore for moving toward and away from said double valve body to selectively engage and move said double valve body to an open position with respect to said first supply connection,
   said slide including a plurality of seals spaced along its length, with a first one of said seals at one end of said slide and movable into said cylindrical seat surface of said double valve body to close said perforation of said double valve body, a second one of said seals adjacent said first seal for closing said valve bore when said first seal is withdrawn from said cylindrical seat of said double valve, a third one of said seals adjacent said second seal for closing said valve bore when said first seal is moved into said cylindrical seat of said double valve, a narrowing of said slide adjacent said second seal for opening said valve bore when said first seal is moved further into said cylindrical seat of said double valve, and a fourth one of said seals adjacent said narrowing of said slide for closing said valve bore when said first seal is in said cylindrical seat and said slide has moved said double valve body to an open position,
   and means for moving said slide through said valve bore.

* * * * *